Figure 1:
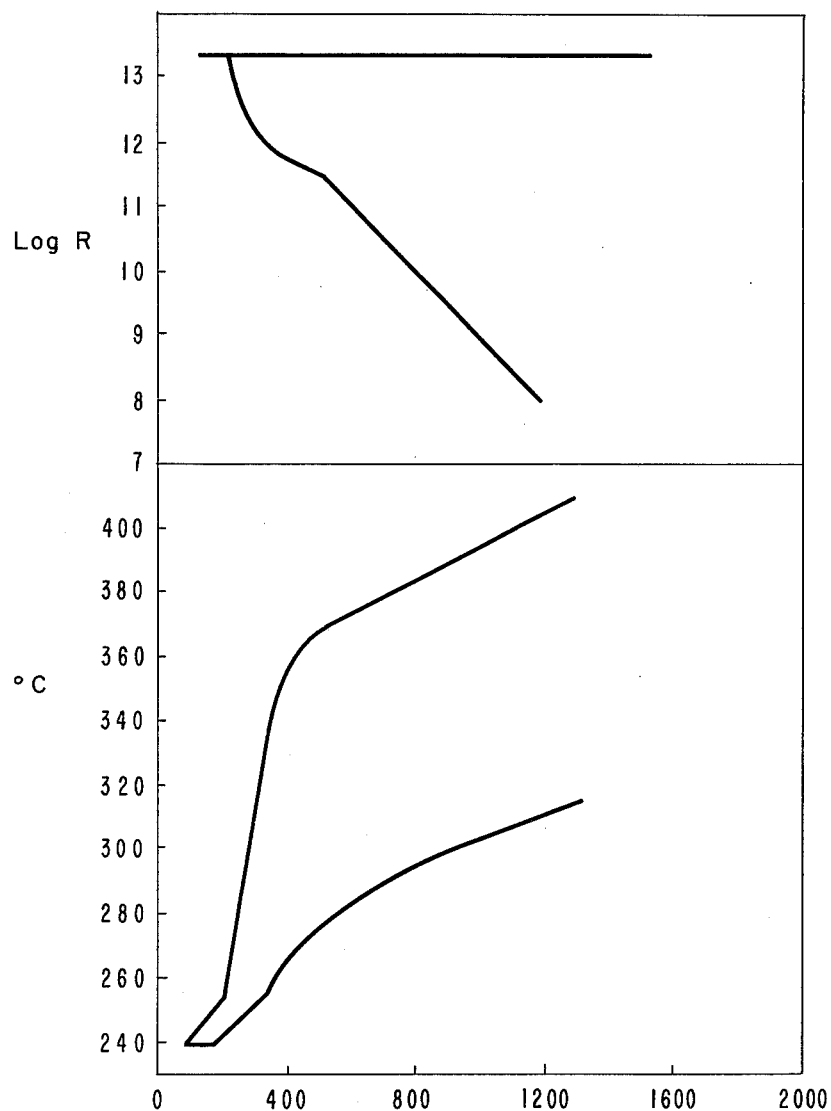

United States Patent Office 2,999,056
Patented Sept. 5, 1961

2,999,056
IRRADIATION BONDING OF ACIDIC COMPOUNDS TO SHAPED POLYMERIC STRUCTURES
David Tanner, Wilmington, Del., assignor to E. I. du Pont de Nemours and Company, Wilmington, Del., a corporation of Delaware
Filed Oct. 4, 1956, Ser. No. 613,984
16 Claims. (Cl. 204—154)

This invention relates to product and process. More particularly it concerns a process for adhering an organic compound to a shaped structure produced from a polymeric substance to be defined hereinafter, and the product formed thereby.

It is an object of the present invention to provide a process wherein there is produced a shaped structure formed from a polymeric substance having adhered thereto a salt of an unsaturated, organic acid.

Another object is to provide a novel shaped structure comprising a polymeric substance to which a salt of an unsaturated organic acid is adhered, whereby the polymer acts as though ionically cross-linked.

These and other objects will become apparent in the course of the following specification and claims.

By the term "polymeric substance," identified above as being the primary constituent of the shaped structures of the present invention, is intended a polymer of the class consisting of a synthetic condensation polymer, a synthetic addition polymer, natural carbonaceous fiber-forming cellulose, protein and polyisoprene polymer, and a natural carbonaceous film-forming cellulose, protein and polyisoprene polymer. Such a material will be referred to hereinafter for brevity and convenience as a "shaped polymeric structure."

In accordance with the present invention a melt resistant shaped polymeric structure is formed by intimately contacting a shaped polymeric structure with a material from the class consisting of an unsaturated organic acid and the salt of a unsaturated organic acid, subjecting the composition to ionizing radiation, thereby causing adherence among the composition components, and, where an unsaturated organic acid is a component of the irradiated composition, thereafter forming the salt of the said acid.

The "ionizing radiation" of this invention is that irradiation which has at least sufficient energy to produce ions or break chemical bonds, and therefore, includes radiation both in the form of particle radiation and in the form of ionizing electromagnetic radiation. While techniques for accurate process control are limited due to the novelty of the art, thereby creating difficulty in conversion of results from one type of irradiation to the other, nevertheless it appears that with adequate adjustment the techniques may be employed interchangeably in the production of any desired product.

By "high energy particle radiation" is meant an emission of highly accelerated electrons or nuclear particles such as protons, neutrons, alpha particles, deuterons, beta particles, or the like, so that the said particle impinges upon the shaped polymer structure bearing the organic acid. The charged particles may be accelerated to high speeds by means of a suitable voltage gradiant (e.g., at least about $10^5$ electron volts), using such devices as a resonant cavity accelerator, a Van de Graaff generator, a betatron, a synchrotron, cyclotron, or the like, as is well known to those skilled in the art. Neutron radiation may be produced by bombardment of selected light metal (e.g. beryllium) targets with high energy positive particles. In addition, particle radiation suitable for carrying out the process of the invention may be obtained from an atomic pile or from radioactive isotopes or from other natural or artificial radioactive material.

By "ionizing electromagnetic radiation" is meant radiation produced when a metal target (e.g., tungsten) is bombarded by electrons possessing appropriate energy. Such energy is imparted to electrons by accelerating potentials in excess of 0.1 million electron volts (mev.), with 0.5 mev. and over preferred. Such radiation, conventionally termed X-ray, will have a short wave length limit of about 0.01 Angstrom units (in the case of 1 mev.) and a spectral distribution of energy at longer wave lengths determined by the target material and the applied voltage. X-rays of wave lengths longer than 1 or 2 Angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma rays. While gamma radiation is distinguished from X-radiation only with reference to its origin, it may be noted that the spectral distribution of X-rays is different from that of gamma rays, the latter being essentially monochromatic, which is never the case with X-rays produced by electron bombardment of a target.

By the term "synthetic condensation polymer" is meant a polymer which can be formed by polymerization with elimination of small molecules such as HCl, $H_2O$, NaCl, $NH_3$ and the like. Among such polymers may be mentioned polyamides, polyureas, polyurethanes, polyesters, polyethers, epoxy resins, polysulfonamides, and the like and copolymers of such materials. By a "synthetic addition polymer" is intended a polymer which can be formed by vinyl polymerization, i.e., polymerization which proceeds by combination of an unsaturated monomer with itself or with other unsaturated monomers by linkage at the olefinic bonds. Among suitable monomers for such polymerization may be mentioned styrene, the acrylic esters, vinyl chloride, vinyl fluoride, vinylidene chloride, vinyl acetate, the vinyl ketones, the vinyl ethers, divinyl ether, the halogen, sulfur, nitrogen and phosphorus containing vinyls, the vinyl silanes, ethylene, tetafluoroethylene, propylene, the allyl esters, acrylonitrile, methacrylonitrile, 1,3-butadiene, isoprene, chloroprene, 2,3-dimethyl-1,3-butadiene and the like. The concepts "a natural carbonaceous fiber-forming cellulose, protein and polyisoprene polymer" and "a natural carbonaceous film-forming cellulose, protein and polyisoprene polymer" comprise those carbonaceous polymers formed in nature which in themselves are fibers or film or whose derivatives may be manufactured into fiber or film form. Among such materials is included cotton, flax, jute, silk, wool, fur, hair, rubber, leather, wood, regenerated cellulose, cellulose acetate, casein, alginate and zein derivatives and the like. Polyamides are especially suitable for the practice of this invention.

Suitable polyamides for the practice of this invention are those synthetic linear polyamides which are prepared from polymerizable monoamino carboxylic acids or their amide-forming derivatives, or from suitable diamine and suitable dicarboxylic acid, or from amide-forming derivatives of these compounds. The preferred polyamides are those wherein the intracarbonamide linkages are other than exclusively aromatic, i.e., there is at least 1 aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid and containing the repeating unit

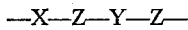

wherein —X— and —Y— represent divalent aliphatic or cycloaliphatic groups and —Z— represents the

linkage. Polyhexamethyleneadipamide and polycaproamide (i.e. "66" and "6" nylons) are typical. Other suitable polyamides are those having the repeating structure

wherein —A— is a divalent aromatic radical and —X— and —Z— are as previously defined. Polyhexamethylene terephthalamide is illustrative of such polymers. Additionally polyamides having repeating units such as

and

wherein —B— is divalent alkaryl (such as xylylene) may be used. Another class of suitable polyamides containing other than aromatic intracarbonamide repeating units are those prepared from piperazine, such as those from piperazine and adipic acid, piperazine and terephthalic acid and the like. Copolyamides, condensation copolymers wherein the amide linkage is the predominant linkage and polyamide mixtures are also useful. As pointed out previously, such polyamides, to form the structures of the present invention, are of a high molecular weight (i.e., they are fiber-forming and have a non-tacky surface at room temperature). As pointed out by Carothers in U.S. 2,071,253, polyamides should have a number average molecular weight of about 10,000 (relative viscosity, 24) to be fiber-forming. Preparation of such polyamides is illustrated in United States Patent Nos. 2,071,250; 2,071,253; and 2,130,948.

The shaped polymeric structure processed in accord with this invention may be in the form of a fiber, film or pellicle. It may be in the form of a woven, knitted or felted fabric, a bristle or artificial straw. The shape is not a critical element in the treatment, except that shapes of increased thickness require a proportionately greater time for complete diffusion of the organic acid to occur. If only surface effects are desired, or if the organic acid or the salt thereof has been previously dispersed in the polymer matrix prior to irradiation, thickness is of no importance. It is merely necessary that the irradiation have enough penetration to activate the substrate at least to the maximum depth required to effect the desired adherence of acid to the shaped polymeric article.

By an "unsaturated organic acid" is meant any organic acid and/or anhydride capable of forming a metal, an amine or an ammonium salt and which contains at least one reactive unsaturated linkage, such as a vinylene or acetylenic group. Since it is desirable that the acid penetrate into the shaped structure and low molecular weight acids penetrate the shaped structure more readily, those acids with up to 5 carbon atoms are preferred. However, acids with as many as 20 or more carbons in their chain are suitable. It is desirable, to obtain maximum activation that the double bond be in close proximity to the acid group. Such a configuration also appears to enhance the rate of penetration of the acid into the shaped structure. Suitable unsaturated monoacids are acrylic, methacrylic, crotonic, furoic and propiolic acids, for example. To produce a slightly different effect (to be described hereinafter), those unsaturated acids which are difunctional are also highly useful. Examples of these are maleic, dichloromaleic, fumaric, and itaconic acids. In addition to the acids, derivatives of acids such as acid chlorides, acid anhydrides, half acid esters and half acid amides are also effective. Any unsaturated organic compound containing functional groups which are convertible to the acid form by methods such as hydrolysis (e.g., esters, nitriles), oxidation (e.g., aldehydes or ketones) or the like are suitable. The unsaturated acid may also contain substituent groups which it may be desirable to attach to the polymer to confer other properties, such as static reduction, moisture repellance, dyeability, flame-proofness, etc. The said substituent groups may also be introduced by copolymerizing suitable monomers with the unsaturated acid.

In addition to the unsaturated carboxylic acids, which form a preferred class for the practice of this invention, other acids are useful. Such acids are the sulfonic acids (e.g., styrene sulfonic acid, ethylene sulfonic acid), unsaturated alkyl or aralkyl acid phosphates, phosphites, phosphonates and phosphinates. Acid alkyl sulfates and carbonates with unsaturated carbon-carbon bonds also have utility.

Another group of compounds which may be attached to the shaped polymeric structure by means of irradiation, in accordance with this invention, are acidic chain transfer agents. Although obviously less reactive than vinyl monomers, and hence less readily grafted in high concentration, they may be attached by means of ionizing radiation and thereafter furnish acid sites from which salts may be formed. Illustrative of such chain transfer agents are, for example, thioglycollic acid, chloropropionic acid and chloroethanesulfonic acid.

In some cases it may be desirable to employ a mixture of unsaturated acids to produce specific effects. This invention also comprehends the application and grafting of one acid followed by the application and grafting of another acid to produce unusual effects.

The shaped polymeric structure to which the unsaturated acid is attached by the process of this invention, is characterized by a plurality of pendent acid groups which are chemically attached to the polymer chain. Such pendent acid groups are susceptible to titration, as disclosed in copending application Serial Number 595,210. To obtain the advantages of this invention, it is desirable to attach unsaturated acid sufficient to provide at least about 300 equivalents of such titratable acid groups per $10^6$ grams of polymer. These acid groups are the total of any free acid end groups derived from polymer, and in addition, those derived from the organic acid grafted thereto.

In accordance with the preferred embodiment of the invention, after the unsaturated organic acid is attached to the shaped polymeric structure by the ionizing radiation, a salt of the acid is formed. Any salt may be formed with the organic acid-modified polymer. Amine salts, metallic salts and ammonium salts are useful. It is merely necessary that the anion of the said salt be of a somewhat weaker acid than the unsaturated organic acid grafted onto the polymer. In general, the greater this difference in acid strength, the greater the amount of ion picked up by the treated polymer, under constant conditions of irradiation dose, concentration, temperature and the like. It is preferable that the dissociation constant of the anion acid be no greater than about one thousandth the corresponding constant for the first hydrogen of the unsaturated organic acid attached to the shaped polymeric structure. Once the salt of the acid has been formed, the cation thereof may be exchanged following ion exchange techniques or metal chelate principles. Instead of attaching the unsaturated organic acid by ionizing radiation prior to salt formation, the steps may be reversed, i.e., the salt of the unsaturated acid may be attached directly to the shaped polymeric structure by ionizing radiation.

Figure 2:
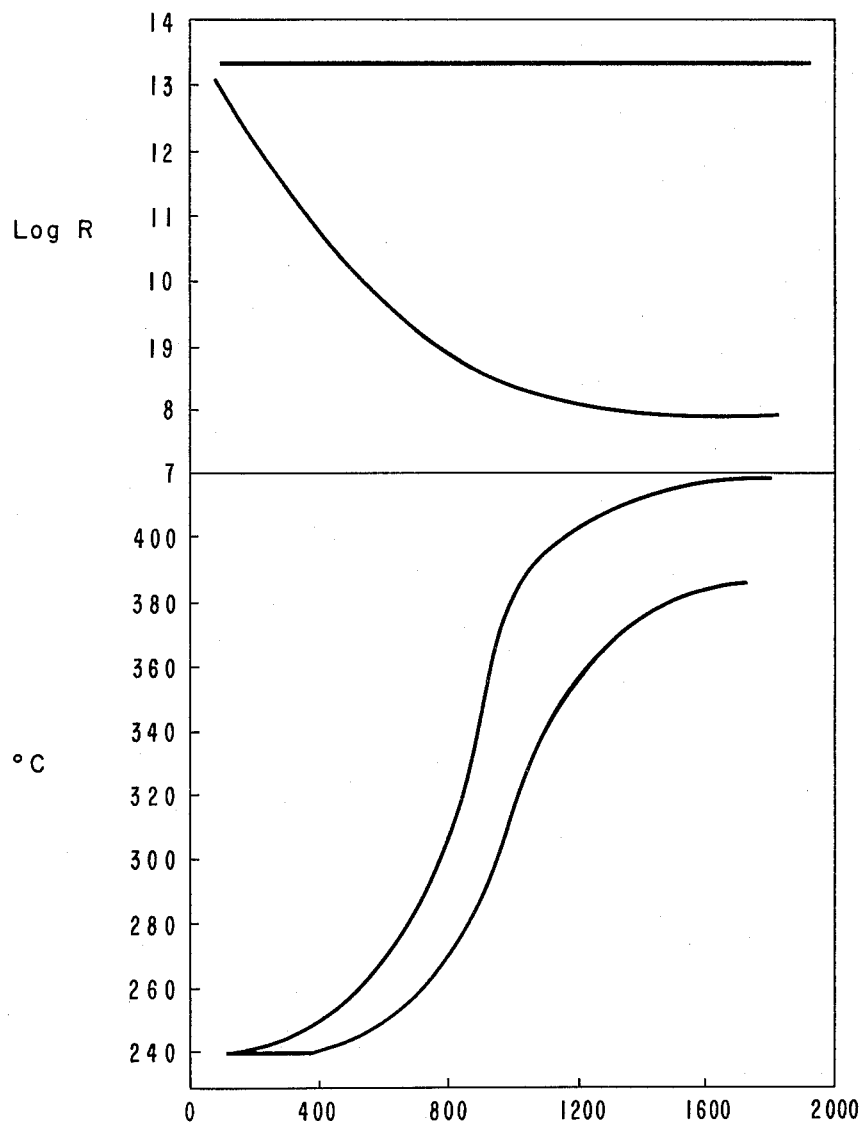

The figures are curves plotting as ordinates on independent scales fiber melt temperature and the log to the base 10 of fabric resistivity against the number of titratable acid groups per $10^6$ grams of polyamide. In FIGURE 1, acid modification of a polyamide is accomplished by grafting on maleic acid. In FIGURE 2, acrylic acid is used for the graft modification. In each pair of curves the upper line represents the relationship between the plotted variables for the calcium salt of the particular acid-modified polyamide. The lower line in each pair of curves represents the relationship between the plotted variables for the sodium salt of the particular acid. The specific data for each curve is presented hereinafter in Examples V and VI.

The following examples are cited to illustrate the invention. They are not intended to limit it in any manner. Unless otherwise noted "66 nylon fabric" employed in the examples is a taffeta fabric, woven from 70 denier polyhexamethylene adipamide continuous filament yarn having a denier per filament of 2.0. The polyamide is produced from hexamethylenediamine and adipic acid (ergo "66"), and has a relative viscosity (as defined in United States Patent No. 2,385,890) of 37, 39 equivalents of —$NH_2$ ends and 92 equivalents of —COOH ends per $10^6$ grams of polymer (referred to hereinafter as 39 amine ends and 92 carboxyl ends, respectively) The polymer is prepared using 0.34 mol percent acetic acid stabilizer (which ends are, of course, not titratable), which is equivalent to 15 amine ends. From these data, following the method of G. B. Taylor and J. E. Waltz ("Analytical Chemistry, vol. 19, p. 448; 1942), the molecular weight (number average) is calculated to be about 13,700.

The "standard washing" to which samples are subjected consists of a 30-minute immersion in 18 liters of 70° C. water contained in a 20-liter agitation washer. The wash solution contains 0.5% of detergent. The detergent employed is that sold under the trademark "Tide" or Procter and Gamble Company of Cincinnati, Ohio. This detergent contains, in addition to the active ingredient, well over 50% (sodium) phosphates (Chemical Industries, 60, 942, July 1947). Analysis shows the composition to be substantially as follows:

| | Percent |
|---|---|
| Sodium lauryl sulfate | 16 |
| Alkyl alcohol sulfate | 6 |
| Sodium polyphosphate | 30 |
| Sodium pyrophosphate | 17 |
| Sodium silicates and sodium sulfate | 31 |

The static propensity of the fabric is indicated in terms of direct current resistance in ohms measured at 78° F. and (except where indicated otherwise) in a 50% relative humidity atmosphere. High values indicate a tendency to acquire and retain a charge and are reported as the logarithm to the base 10, being designated "log R."

The irradiation is carried out using a Van de Graaff electron accelerator with an accelerating potential of 2 million electron volts (mev.) with a tube current of 250 to 290 microamperes. Samples to be irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available dose per pass of one mrep. Radiation dosages may be given in units of "mrep." (millions of roentgen equivalents physical), a rep. being the amount of high energy particle radiation which results in an energy absorption of 83.8 ergs per gram of water or equivalent absorbing material. Alternatively, dosages may be indicated in terms of exposure in watt sec./cm.$^2$.

When ionizing electromagnetic radiation is used to induce bonding, the electron beam from the Van de Graaff machine, operated as described above, is directed onto a gold target, and the test samples are irradiated with the X-rays produced. Doses of X-radiation are given in units of "mr." (millions of roentgen), as is conventional. A roentgen is that amount of electromagnetic radiation which when absorbed in 1 cc. of dry air at standard temperature and pressure will produce 1 electrostatic unit of charge of either sign.

Where quantitative values for hole melting are presented, they are measured by dropping heated glass beads of constant weight and diameter from a fixed height from a constant temperature oven onto the fabric. The temperature at which the fabric is stained is called the first damage temperature, and the temperature at which the glass bead melts completely through the fabric is referred to as the hole-melting temperature. Where the hole melting tendency is presented in qualitative terms the designation "poor" denotes a quantitative rating of about 300° C.; "fair"—a rating of about 400° C. to about 500° C.; "good"—a rating of about 600° C. or slightly better; and "excellent"—a rating well over 600° C.

The fiber melt temperature reported in some examples is determined by placing a thread, unraveled from a fabric if necessary, upon an electrically heated tube and observing the tube temperature at which visible melting or instantaneous decomposition occurs.

Post-formability is evaluated by contacting a yarn from a sample with a tube heated to about 225° C. A fiber which can be drawn in contact with the tube and without substantially fusing the filaments to two or three times its original length is designated "elastic." When the stretch is retained on cooling, it is designated "post-formable."

EXAMPLE I

A swatch of 66 nylon fabric is padded to saturation with a solution of 25 grams of maleic anhydride dissolved in 75 grams of water, wrapped in aluminum foil and is passed 40 times under an electron beam from a Van de Graaff electron accelerator. The total exposure is 40 mrep. or 500 watt-sec./cm.$^2$. The treated fabric is removed from the aluminum foil and agitated for 2 hours in a 20 liter washing machine containing distilled water at 70° C. to remove unreacted maleic anhydride. The weight gain of the fabric after drying is 8%. When either the padding with maleic anhydride or the irradiation step is omitted, then no weight gain is observed.

The maleic acid-modified nylon is next aftertreated, to form a metallic salt of the acid, by agitation for 2 hours in a 20-liter washing machine containing 20 grams of "Tide" detergent (which contains basic metallic salt as shown hereinbefore) dissolved in 18 liters of distilled water at 70° C. It is then thoroughly rinsed in distilled water and dried. An additional weight gain of 7% is noted. When hot ashes from a burning cigarette are flicked onto the fabric, after it has been liquid immersed, irradiated, ion-treated, washed and dried, only a small brown stain results. Holes are immediately melted through a fabric which has not been treated with the unsaturated acid and the metallic ions, whether irradiated or not. The quantitative hole-melting tendency determination of the fabric treated according to this example shows a first damage temperature of 300° C. vs. 275° C. for an untreated control and a hole-melting temperature of more than 600° C. vs. 310° C. for an untreated control. The fabric produced has elastomer properties such that when heated above 185° C. it can be formed and drawn to as much as 3 times its room temperature length. In addition it is observed to have been delustered, as is shown by reduction in the percent of incident light transmitted from an original value of 1.5% to 0.5%. Furthermore, the texture is changed so that it has a much drier handle than the untreated control. The product is soluble in 90% formic acid, but is insoluble in hot m-cresol. The original nylon is soluble in both solvents.

When the fabric modified in accordance with the example is stirred for one hour at 70° C. in a beaker containing 190 ml. of distilled water and 10 grams glacial acetic acid (to remove metallic ions from the fabric and regenerate acid), the fabric loses its high temperature elastomer properties. Furthermore, its hole-melting resistance is reduced to that of an untreated control and it is soluble in hot m-cresol. Its resistance to hole-melting is restored by a second washing treatment in the "Tide" detergent solution, and the fabric is again insoluble in hot m-cresol. When a 0.1 normal hydrochloric acid aqueous solution is substituted for the aqueous 5% acetic acid solution, to remove metallic ions, similar results are obtained.

EXAMPLE II

A portion of nylon fabric is immersed in a 25% solution of maleic anhydride, the excess liquid squeezed from it, the sample enclosed in aluminum foil and irradiated under the conditions of Example I. The irradiation exposure is 40 passes (40 mrep.) or 500 watt-sec./cm.$^2$. After irradiation the sample is cut into 6 pieces marked A to F inclusive. The pieces, except for sample F, are washed in an agitation washer using 70° C. water and the salts as indicated in Table 1. After the washing treatment the nylon fabric samples are rinsed, dried and tested to determine their resistance to hole-melting, with the results indicated in Table 1. Sample F$_1$ is a control which is subjected to all the treatments outlined above except irradiation.

Table 1

| Sample | Wash composition [1] | Number of Washings | Resistance to hole-melting |
|---|---|---|---|
| A | 20 grams "Tide", 18 liters of tap water | 2 | Excellent. |
| B [2] | 20 grams "Tide", 18 liters of tap water | 2 | Fair. |
| C | 18 liters of tap water | 1 | Good. |
| D | 18 liters of distilled water | 1 | Poor. |
| E | 13 grams of Na$_3$PO$_4$.12 H$_2$O, 18 liters of tap water | 1 | Excellent. |
| F | No washing | None | Poor. |
| F$_1$ | 20 grams "Tide", 18 liters of tap water | 2 | Do. |

[1] Tap water used contains approximately 11 parts per million of calcium ion.
[2] No agitation used.

The results obtained in this example show that substantial resistance to hole-melting is produced when the nylon farbic with the maleic anhydride grafted thereon is exposed to salt producing metal ions present in the "Tide" solution, in the hard tap water, or in the solution containing sodium phosphate. It is also apparent that a material improvement in the treatment is obtained when the treatment is carried out under conditions of agitation.

EXAMPLE III

Portions of nylon fabric are immersed in 25% aqueous maleic anhydride, then irradiated using the technique and the conditions of Example I. The irradiated fabric is divided into sections and treated as shown in Table 2. Sample swatches G to L are subjected to 40 passes under the Van de Graaff electron accelerator for a total exposure of 500 watt-sec./cm.$^2$, and samples M to O inclusive are given an exposure of 80 passes for a total exposure of 100 watt-sec./cm.$^2$. Each of the irradiated samples is then agitated for 1 hour at 70° C. in a washing machine containing 18 liters of distilled water and 20 grams of the salt indicated in the table. The samples are then rinsed in hot distilled water, dried and tested for resistance to hole-melting. Sample M (with cupric ion attached) is light green in color and N (with cobaltous ion) is light pink.

Table 2

| Sample | Salt in treating solution | Resistance to hole-melting |
|---|---|---|
| G | Sodium carbonate | Excellent. |
| H | Potassium carbonate | Do. |
| I | Potassium acetate | Good. |
| J | Calcium acetate | Excellent. |
| K | Manganous acetate | Do. |
| L | Zinc acetate | Do. |
| M | Cupric acetate | Good. |
| N | Cobaltous acetate | Excellent. |
| O | Chromic acetate | Good. |

From the above results it is apparent that a substantial improvement in resistance to hole-melting has been attained by treatment of the irradiated, maleic anhydride-grafted nylon fabric with a variety of positively charged salt forming ions.

EXAMPLE IV

The effect of the acid strength of the anion of the cation employed in forming the salt of the acid-modified polyamide is shown in this example. Three nylon fabric samples coded Q,R,S, are immersed in maleic anhydride solution and irradiated to the same exposure as samples M to O of Example III. Each is then immersed in a solution containing 10 parts of the salt as identified in Table 3, in 100 parts of water. The samples are each boiled in their respective salt solutions for 30 minutes, rinsed in hot distilled water, dried and tested for resistance to hole-melting. Results are shown in Table 3. Table 3 also lists the anion of the metal salt, and dissociation constant for the reaction whereby that anion is produced from its parent acid.

Table 3

| Sample | Salt | Anion | Dissociation [1] constant | Resistance to hole-melting |
|---|---|---|---|---|
| Q | NaH$_2$PO$_4$.H$_2$O | H$_2$PO$_4^-$ | 1.1×10$^{-2}$ | Poor. |
| R | Na$_2$HPO$_4$.H$_2$O | HPO$_4^=$ | 7.5×10$^{-8}$ | Good. |
| S | Na$_3$PO$_4$.12H$_2$O | PO$_4^\equiv$ | 4.8×10$^{-13}$ | Do. |

[1] Handbook of Chem. & Phys., 34 Ed., P. 1560 (Chem. Rubber Pub Co., Cleveland—1952).

The dissociation constant of the maleic acid grafted to the polyamide is 1.5×10$^{-2}$ for the first hydrogen and 2.6×10$^{-7}$ for the second. Thus, when an attempt is made to form the salt of the acid-modified polyamide with a solution having about the same acid strength as the modifying acid (sample Q), little effect in producing resistance to hole melting is observed. Good results are obtained when salts with acid anions weaker than those of the modifying acid are used.

Similarly, good resistance to hole melting is attained when acid-modified form of the polyamide labeled "G" (Example III, above) is exposed to sodium hydroxide solution. No improved hole melting resistance results, however, when the sodium hydroxide is replaced by sodium chloride.

It is also to be noted that in Example III, sample H, treated with potassium carbonate (acid dissociation constant, 3.5×10$^{-7}$) gives better resistance to hole melting than Sample I, treated with potassium acetate (acid dissociation constant, 1.75×10$^{-5}$).

EXAMPLE V

A series of 9 samples of nylon fabric, coded T to AB, are treated with 25% aqueous maleic acid solution and are then irradiated using the technique of Example I with the radiation doses shown in Table 4 below. After radiation, the samples are rinsed well in distilled water to remove unreacted acid. Analysis of the acid-modified samples so produced shows the presence of a large number of attached carboxyl groups, as well as a weight gain linearly proportional to the irradiation dose.

Table 4

| Sample | Dose, mrep. | Weight gain, percent | —COOH equiv./10⁶ gm. nylon |
|---|---|---|---|
| T (control) | 0 | | 92 |
| U | 2 | 1.4 | 166 |
| V | 5 | 1.9 | 213 |
| W | 10 | 3.0 | 330 |
| X | 15 | 4.0 | 419 |
| Y | 20 | 4.7 | 507 |
| Z | 30 | 8.5 | 771 |
| AA | 40 | 9.6 | 796 |
| AB | 60 | 12.3 | 1,186 |

To prepare the salt of the acid modified polyamide a portion of each of the samples T to AB is agitated for 1 hour at 80° C. in a 1% aqueous (distilled water) solution containing twice the fabric sample weight of $Na_2CO_3$. After reaction with the $Na^+$ ions, the samples are again thoroughly rinsed and dried, and are then given various characterization tests, with the results shown in Table 5.

Table 5

SODIUM SALT OF GRAFTED MALEIC ACID

| Sample | Log R | Fiber melt temperature, °C. | Resistance to hole melting | Post-formable |
|---|---|---|---|---|
| T | 13.3 | 240 | Poor | No. |
| U | 13.3 | 240 | do | No. |
| V | 13.3 | 250 | do | No. |
| W | 12.0 | 255 | Poor to fair | Slightly. |
| X | 11.7 | 255 | Fair | Yes. |
| Y | 11.5 | 275 | do | Yes. |
| Z | 10.1 | 280 | Good | Yes. |
| AA | 9.9 | 305 | do | Yes. |
| AB | 8.0 | 310 | Excellent | Yes. |

A second portion of samples T to AB is agitated for 1 hour in hot (80° C.) tap water containing about twice the fabric sample weight of calcium acetate (as a 1% solution) whereby the calcium salt is formed on and within the fiber. The samples are thoroughly rinsed in hot distilled water, dried and tested as before, with the results shown in Table 6.

A second control of unmodified, irradiated nylon shows the properties of sample T.

Table 6

CALCIUM SALT OF GRAFTED MALEIC ACID

| Sample | Log R | Fiber Melt temperature, °C. |
|---|---|---|
| T (control) | 13.3 | 236 |
| U | 13.3 | 236 |
| V | 13.3 | 255 |
| W | 13.3 | 350 |
| X | 13.3 | 350 |
| Y | 13.3 | 374 |
| Z | 13.3 | 374 |
| AA | 13.3 | 390 |
| AB | 13.3 | 405 |

The relation between the number of titratable acid groups on the nylon and the resistivity and fiber melt temperature of the sodium and calcium salt products are shown graphically in FIGURE 1. The top curve in each pair is the calcium salt, the lower being the sodium salt. It is apparent that appreciable modification of fiber properties is obtained on metal ion treatment when about 300 titratable acid groups are present on the polyamide. Although minor changes may be noted in some cases with 200 acid groups, highly effective changes are produced with 400 or more such groups. Calcium ion is more efficient, on a mole basis, than sodium in improving melt resistance, while sodium ion is preferred when improved antistatic properties are also desired.

EXAMPLE VI

Unsaturated homopolymerizable monobasic acids are likewise highly effective modifiers. Samples AC to AI of nylon fabric are treated with solutions of commercial acrylic acid in water, at the concentrations shown in Table 7. After soaking for over 30 minutes, the samples are wrung out, wrapped in aluminum foil, and irradiated as in Example I. A dose of only 1 mrep. is employed. The samples are then rinsed in distilled water to remove unreacted acid, dried, and the weight gain and titratable carboxyl groups determined.

Table 7

| Sample | Concentration of acrylic acid, weight percent | Weight gain, percent | —COOH equiv./10⁶ gm. |
|---|---|---|---|
| AC | 0 | 0 | 92 |
| AD | 2 | 3.0 | 439 |
| AE | 5 | 5.8 | 737 |
| AF | 10 | 9.8 | 1,100 |
| AG | 15 | 13.7 | 1,433 |
| AH | 20 | 18.2 | 1,699 |
| AI | 25 | 22.3 | 1,678 |

When the test is repeated, using a solution of 10% methacrylic acid and 25% methacrylic acid solution the weight gains observed are 19 and 34%, respectively. It is of interest to note that the acrylic acid and methacrylic solutions can be used effectively even though they contain conventional polymerization inhibitors.

The samples of Table 7 are divided, treated with sodium and calcium ion solution, and tested, following the same procedure as in Example V. The properties are as shown in Tables 8 and 9.

Table 8

SODIUM SALT OF GRAFTED ACRYLIC ACID

| Sample | Log R | Figer melt temp. °C. | Resistance to hole melting | Post-formable |
|---|---|---|---|---|
| AC (control) | 13.3 | 240 | Poor | No. |
| AD | 9.8 | 240 | Fair | Yes. |
| AE | 9.5 | 260 | Good | Yes. |
| AF | 8.1 | 352 | Excellent | No. |
| AG | 8.1 | 360 | do | No. |
| AH | 8.0 | 380 | do | No. |
| AI | 7.7 | 390 | do | No. |

When the log R value for sample AI is measured at 5% relative humidity, it rises only to a value of 10.1. Moreover, the moisture regain of this sample is 17.8% as compared to 4.5% for unmodified nylon. Both measurements of the moisture regain are carried out at 72% relative humidity.

While polyamide samples modified with the salt of either maleic or acrylic acid are post-formable when about 400 or more acid groups are introduced (samples X and AD), when higher concentrations of carboxyl groups derived from acrylic acid (e.g., over 1000 as in sample AF) are introduced, the samples are no longer post-formable. The property of post-formability is retained at the high level of carboxyl content when the modification is made by means of maleic acid salt. While applicant does not wish to be bound by any theory of operation, this difference is thought to illustrate slightly different reaction mechanisms. For example, acrylic acid, which is readily homopolymerizable, is believed to form long chains which are initiated at each reactive site upon the polyamide substrate. Thus, a minimum exposure to irradiation is necessary in order to attain a high degree of modification of fiber properties. On the other hand, maleic anhydride, which is not capable of undergoing homopolymerization, is thought to react so that one molecule is attached to each free radical site produced by irradiation. Thus, in the latter product, the carboxyl groups are evenly distributed throughout the polymer chains. However, a higher irradiation dose is required to attain an equivalent addition of acid groups.

Table 9
CALCIUM SALT OF GRAFTED ACRYLIC ACID

| Sample | Log R | Fiber melt temp., °C. |
|---|---|---|
| AC | 13.3 | 236 |
| AD | 13.3 | 250 |
| AE | 13.3 | 284 |
| AF | 13.3 | 396 |
| AG | 13.3 | 414 |
| AH | 13.3 | 417 |
| AI | 13.3 | 420 |

FIGURE 2 plots as absscissa the number of titratable carboxyl groups grafted onto the nylon treated with acrylic acid, in relation to the resistivity and the fiber melt temperature of the sodium and calcium salt products. Here againt he upper curve in each pair represents the calcium salt while the lower curve represents the sodium salt. As in Example V it is notable that significant improvement in fiber properties are obtained by metal ion treatment when about 300 titratable acid groups are present on the polyamide.

When the methacrylic acid modified polyamide samples are treated with sodium and calcium ions, following the procedure described for the acrylic acid samples, similar properties are obtained. All samples show a high degree of resistance to hole melting.

EXAMPLE VII

Samples of nylon fabric marked AJ to AS are immersed in solutions of the acids indicated in Table 10, and are thereafter treated and irradiated in accordance with the procedure of Example I. After irradiation, excess acid is removed by rinsing in hot distilled water. Thereafter the samples are dried and the weight gain and the titratable carboxyl groups determined. The results are shown in Table 10. An irradiated unmodified control (AT) is included for comparative purposes. The blanks in the table represent variables which are not determined.

Table 10

| Sample | Agent | Concn., percent | Dose, mrep. | Weight gain, percent | -COOH, equiv/ $10^5$ gm. |
|---|---|---|---|---|---|
| AJ | Maleic anhydride | 25 | 20 | 3.5 | 501 |
| AK | Dichloromaleic acid | 25 | 20 | 2.1 | 337 |
| AL | Difluoromaleic acid | (¹) | 20 | 10.3 | 1,321 |
| AM | Fumaric acid | (¹) | 20 | 4.9 | 882 |
| AN | Itaconic acid | (¹) | 20 | 10.3 | 964 |
| AO | Acrylic acid | 25 | 20 | 33.0 | 1,196 |
| AP | Crotonic acid | 25 | 80 | 14.0 | |
| AQ | Furoic acid | (¹) | 80 | 9.0 | |
| AR | Succinic acid | (¹) | 40 | | |
| AS | Propiolic acid | 10 | 40 | 11.7 | |
| AT (control) | None | None | 20 | None | 112 |

¹ Saturated.

Table 11
CALCIUM SALT OF ACIDS OF TABLE 10

| Sample | Calcium ions/$10^5$ gm. nylon, by analysis | Fiber melt temp. °C. | Resistance to hole-melting |
|---|---|---|---|
| AJ | 262 | 376 | Excellent. |
| AK | 125 | | Do. |
| AL | | 360 | Do. |
| AM | 280 | 290 | Do. |
| AN | 420 | 345 | Do. |
| AO | 1,308 | Over 500 | Do. |
| AP | | | Good. |
| AQ | | | Do. |
| AR | | | Poor. |
| AS | | 320 | Excellent. |
| AT (control) | None | 240 | Poor. |

After the acid has been attached by ionizing radiation the calcium salt is prepared, following the procedure of Example VI. The calcium ions attached to the acid-modified nylon are determined by conventional analytical techniques, which values are recorded in Table 11. The blanks in the table indicate properties not quantitatively determined. For comparison, the fiber melt temperature of each sample is also indicated. Although it is apparent that there is not always a close correlation between the calcium ion determined by the employed method of analysis and the number of titratable groups (especially for high degrees of modification), it is obvious that appreciable amounts of the metal ion have become attached to the fiber through the various acids grafted thereto.

Sample AS (modified with propiolic acid) is converted to the sodium salt by washing in sodium hexametaphosphate solution followed by agitation in sodium hydroxide solution. It is found to have a log R value of 10.3 after the standard rinsing procedure, and a melt temperature of 310° C.

The metallic salts of the acid-modified samples are further characterized by the fact that they are substantially soluble in 90% formic acid but insoluble in hot m-cresol. Sample AR, treated with succinic acid (not among the unsaturated organic acids effective in preparing the product of this invention) shows no improvement in hole-melting after irradiation and treatment in the alkaline sodium ion solution.

EXAMPLE VIII

A sample of nylon fabric is soaked in an aqueous solution containing 20% potassium acrylate and methylene blue inhibitor for a period of about 30 minutes. The sample is then irradiated following the technique and under the conditions of Example I to a total dose of 40 mrep. It is thereafter given 15 standard washings, using "Tide" detergent in tap water. After drying an 11% weight gain is noted. The "Tide" washings result in exchange of the potassium ion of the original potassium acrylate for calcium ion. Log R is high (13.1) as is usual for the calcium salt of an acid-modified polyamide. However, no resistance to hole melting is observed.

When the calcium salt of the above acid-modified polyamide is transformed into the sodium salt (by washing the sample with an aqueous solution of hexametaphosphate to sequester calcium ions and sodium hydroxide to supply sodium ions), the log R value after rinsing and drying is 8.9. A slightly improved resistance to hole melting over the original nylon sample is noted.

While the inventor does not wish to be bound by any particular theory, it is felt that the above results are due to the poor absorption characteristics of the potassium acrylate causing a modification only at the surface of the shaped structure. Thus surface effects such as static propensity may be controlled by the technique of the example, however, the melting point of the main body of the structure can be affected only by increasing absorption of the modifier by the fabric.

EXAMPLE IX

A fabric sample, woven from filaments spun from polyamide prepared from 1,3-bis(aminomethyl)benzene and adipic acid, is modified with acrylic acid (applied from a 25% aqueous solution). An irradiation exposure of one mrep. is employed. The acid-modified sample is rinsed 3 times in hot (80° C.) distilled water. The product is then exposed to the sodium carbonate as taught in Example V. It has excellent resistance to hole melting and log R value of 8, as compared to a value of 13.3 for the unmodified polyamide control. The unmodified polyamide has 48.5 titratable carboxyl groups while the acid-modified polyamide has more than 1400 such groups.

EXAMPLE X

The presence of relatively large quantities of extraneous materials mixed with the modifying unsaturated organic acid does not appear to unduly interfere with production of the product of the present invention. For example, a sample of nylon fabric is immersed in a mixture of 30 parts maleic anhydride, 70 parts methoxydecaethyleneoxy methacrylate monomer and 100 parts of water. The sample is wrung out, wrapped in aluminum foil and is irradiated to a total dosage of 20 mrep. (125 watt-sec./cm.²) using the equipment and technique of Example I. The fabric is then subjected to 15 standard washings using "Tide" detergent containing sodium ions as disclosed hereinabove. It is observed to have a much drier hand than an irradiated comparative control which was not immersed in the liquid mixture prior to irradiation. Hot ashes from a burning cigarette are flicked onto the liquid immersed, irradiated, washed fabric to determine its hole-melting tendency. Only a small brown stain results. Holes are immediately melted through the original fabric, whether irradiated or not.

Although the process of this invention has been described in detail in terms of application to polyamide polymers, it is also effective for other polymers, as previously disclosed, and as illustrated in the following examples.

EXAMPLE XI

A series of fabric samples coded AU to BB is prepared, using similar test and control portions. The test samples are soaked in 25% aqueous acrylic acid for 30 minutes, then irradiated as in Example I with a dose of one mrep. After irradiation, the test swatches are rinsed in distilled water at 80° C. for 1 hour and the weight gain of samples AV and AX is determined. The test samples are then agitated for 1 hour in a 2% aqueous solution of $Na_2CO_3$ at 80° C., followed by several rinses in 80° C. distilled water. They are then dried and tested, along with the untreated controls, with the results shown in Table 12.

Table 12

| Sample | Fabric | Weight gain, percent | Log R | Resistance to hole melting |
| --- | --- | --- | --- | --- |
| AU—control | Wool | | 12.1 | Fair. |
| AV test | do | 11 | 7.5 | Excellent. |
| AW—control | Cellulose acetate | | 13.3 | Fair. |
| AX test | do | 21 | 7.5 | Excellent. |
| AY—control | Cotton | | 10.0 | Fair. |
| AZ test | do | | 7.5 | Excellent. |
| BA—control | Silk | | 13.1 | Poor. |
| BB—test | do | | 7.8 | Fair. |

In addition to the changes listed in Table 12, it is noted that test sample AV, AX, and AZ had a livelier, bulkier handle than the control swatches. A similar change in handle is noted in a piece of viscose rayon which is subjected to the test treatment.

Many of the synthetic fibers are known to be difficult to treat with modifying agents such as antistatic agents, sizes, dyestuffs and the like, due to their lack of chemical reactivity. It has been discovered, however, that they can be effectively modified by the process of this invention if the unsaturated acid is allowed sufficient time to penetrate into the fiber, as will be shown in the following examples.

EXAMPLE XII

A swatch of fabric prepared from polyvinyl chloride staple is soaked in 25% acrylic acid solution for 12 hours, and is then irradiated to a dose of 2 mrep. After the washing treatment of Example XI, the weight gain is 0.9%. After exposure to $Na_2CO_3$ solution, following the procedure of Example XI, the log R is 8.7, as compared to 13.3 for an untreated control. When the test is repeated with a swatch of polyacrylonitrile staple fabric, with the exception that the swatch is soaked in the acrylic acid solution for 7 days, followed by an irradiation of 20 mrep., the weight gain is 16%, the log R is reduced from 13.2 (control) to 7.5. The resistance to hole melting is improved from "poor" for the control to "excellent." The test swatch has a fiber melt temperature of over 500° C.

EXAMPLE XIII

A sample of fabric woven from continuous filament polyethylene terephthalate yarn is treated as described in Example XI. The soaking time in acrylic acid is 18 days, and the irradiation dose is 20 mrep. A weight gain of 4% due to grafted acid is observed, and the log R of the sodium salt-modified fabric is reduced from 13.3 to 9.0. Hole melting resistance is improved from an original rating of "poor" to a rating of "good."

The process of this invention is much superior to conventional radiation crosslinking treatments for improving the high temperature properties of polyethylene film, as shown by the following example.

EXAMPLE XIV

Samples of polyethylene film, BF, BG, BH, are soaked in acrylic acid and irradiated as shown in Table 13, following the procedure of Example XI. The samples are further processed as in Example XI, and are tested, with the results listed in Table 13. Control samples BC, BD, BE, which are irradiated but receive no chemical treatments, are included for comparison.

Table 13

| Sample | Acrylic soak, days | Radiation dose, mrep. | $Na_2CO_3$ treat. | Log R | Resist. to hole melting | Melt temp., °C. |
| --- | --- | --- | --- | --- | --- | --- |
| BC | None | 2 | None | 13.1 | Poor | 215 |
| BD | None | 5 | None | 13.1 | do | 215 |
| BE | None | 20 | None | 13.1 | do | (¹) |
| BF | 3 | 20 | Yes | 9.0 | Fair | 286 |
| BG | 13 | 2 | Yes | 8.5 | do | 286 |
| BH | 13 | 5 | Yes | 7.6 | do | (¹) |

¹ Not determined.

It can be seen that the irradiation alone does not appreciably increase the resistance to hole melting, but that the sodium-acrylate-grafted polyamide is more resistant to hole melting, and has a significantly higher melt temperature.

Although the process of this invention has been described in terms of grafting an unsaturated carboxylic acid to the shaped polymeric structure followed by reaction to form the metal salt of said acid, or even as one step process in which the organic salt (e.g., potassium acrylate) is grafted in a single operation, other acids are also effective, as shown by the following examples.

EXAMPLE XV

A portion of nylon fabric is soaked in an aqueous solution of potassium styrene sulfonate and is then irradiated with a dose of 20 mrep., following the procedure described hereinabove. The sample is rinsed in methanol to remove excess monomer, followed by a 30-minute washing in acetone to remove surface polymer. It is then given 10 standard washings in "Tide" detergent, and its antistatic properties are tested. The log R value is 11.6, compared to the value of 13.2 for untreated nylon.

When the test is repeated using a highly purified potassium styrene sulfonate (96.5% pure monomer), in which the nylon sample is soaked (as a 25% aqueous solution), and is then irradiated to a dose of 15 mrep., the sample after washing shows a weight gain of 18.9%. When it is tested for antistatic properties it has a log R value, after 25 "Tide" washes, of 9.6. The sample is also resistant to hole melting, is more resilient than an untreated 66 nylon control, and is more resistant to soiling by dry or oily soils.

Similar results are obtained when the fabric is first irradiated (at Dry Ice temperature) and then contacted with the potassium styrene sulfonate solution.

EXAMPLE XVI

This example illustrates the use of basic organic ions in forming the salt of acid modified polyamide. A sample of 66 nylon fabric (labeled BU), is prepared by soaking in 10% acrylic acid solution and then irradiating, so that it is similar to sample AR of Example VI (Table 7). Three other 66 nylon samples, identified as BV, BW, BX, are likewise prepared by soaking in 25% acrylic acid solution followed by irradiating, so that they are substantially similar to sample AI in Example VI. These samples, after irradiating and washing, are soaked overnight at room temperature in the aqueous solutions indicated in Table 14. After overnight soaking, sample BX is agitated in the polymeric quaternary amine solution for an hour at about 40–50° C. The samples are then rinsed in distilled water and the weight gain induced by the formation of the amine salt is determined. In addition, the log $R$ value and the resistance to hole melting is measured with the results listed in Table 14. In addition to the listed property changes it is noted that all the samples are highly wickable (rapidly absorb water) and samples BU, BV and BW are post-formable. In addition these samples show a high receptivity to acid dyes.

*Table 14*

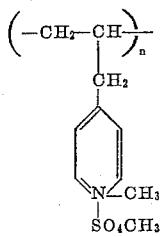

| Sample | Treating agent | Weight gain after treating, percent | Log $R$ | Resist to hole melting |
|---|---|---|---|---|
| BU | 82% hexamethylene diamine | 4.7 | 10.1 | Fair. |
| BV | 82% hexamethylene diamine | 10.9 | 8.7 | Good. |
| BW | 30% aqueous NH$_4$OH | (¹) | 10.7 | Do. |
| BX | 15% aqueous solution of a poly methylpyridinium sulfate of the formula | 1/2 | 11.0 | Poor. |

¹ Not determined.

property of the amines themselves. The poor resistance to hole melting imparted by treatment with the polymeric quaternary amine (sample BX) is believed to be due to poor penetration. Any amine or quaternary ammonium compound may be employed. Among these may be mentioned ammonia, aliphatic, aromatic, cycloaliphatic and heterocyclic amines such as ethylamine, diethylamine, triethylamine, triethanolamine, guanidine, aniline, benzylamine, cyclohexylamine, piperidine, morpholine and the like. So also the nature of the quaternary ammonium ion used in salt formation is not critical. Methylpyridinium chloride, trimethylbenzylammonium chloride, tetramethyl ammonium chloride and the like may be used.

EXAMPLE XVII

Samples of 66 nylon fabric and 6 (polyamide from caprolactam) nylon fabric, prepared from 70 denier, 34 filament yarn, are cut into 8" x 1" strips and soaked in various unsaturated acids as shown in Table 15. Each sample is then folded into 1" x 1" squares, individually wrapped in aluminum foil, and is exposed to X-radiation produced from 2-million electron volt (2 mev.) Van de Graaff electron accelerator. The accelerator is operated so that the electrons impinge on a gold target, generating X-rays which are directed onto the pile of samples. The distance of the sample to the tube window is 2 centimeters. A tube voltage of 2 mev. and a current of 250 microamperes is used, resulting in a radiation dosage of about 2-millions of roentgen (mr.) per hour.

After radiation for a period of 8 hours, giving an exposure of about 15 mr., the fabric samples are removed and washed in distilled water at about 70° C., with vigorous agitation, for several half-hour periods. They are then dried and weighed. The weight gain of each is shown in Table 15. The fabrics of acid-modified polyamide so produced are then treated with various metallic salts dissolved in water at 70° C., with rapid agitation, covering several 1-hour periods to form the metallic salt derivatives. The samples are thereafter rinsed thoroughly in distilled water, dried, weighed, and tested for heat resistance.

Maleic anhydride and maleic acid are applied to the polymer substrate as a 25% solution in water. The itaconic and fumaric acids are applied as saturated aqueous solutions. The calcium acetate solution used in forming the metallic salt derivative consists of 50 grams of calcium acetate dissolved in 5 liters of distilled water. The trisodium phosphate (10 g.) is dissolved in 5 liters of distilled water. The results of these tests are indicated in Table 15.

*Table 15*

| Sample | Fiber | Unsaturated acid | Weight gain percent | Metallic salt | Additional weight gain percent | Resistance to hole melting |
|---|---|---|---|---|---|---|
| BI | Nylon 66 | Maleic anhydride | 9.2 | Ca(CH$_3$COO)$_2$ | 3.5 | Excellent. |
| BJ | do | do | 9.2 | Na$_3$PO$_4$ | 0.5 | Do. |
| BK | do | Itaconic acid | 9.2 | Ca(CH$_3$COO)$_2$ | 2.4 | Do. |
| BL | do | do | 9.2 | Na$_3$PO$_4$ | 0.5 | Do. |
| BM | do | Fumaric acid | 8.0 | Ca(CH$_3$COO)$_2$ | 2.6 | Do. |
| BN | do | do | 8.0 | Na$_3$PO$_4$ | (¹) | Do. |
| BO | Nylon 6 | Maleic acid | 6.8 | Ca(CH$_3$COO)$_2$ | 2.9 | Do. |
| BP | do | do | 6.8 | Na$_3$PO$_4$ | 0.8 | Good. |

¹ Not measurable.

In this example the polyamide is rendered melt resistant by the formation of salts which are not distinguished by having a high degree of heat resistance in themselves. It is believed therefore that this melt resistance is produced by the formation of ionic bonds throughout the polymer network, rather than by any heat resistance The mechanism in forming the product of the present invention is not clearly understood. It is theorized that the unsaturated organic acid diffuses into the polymer substrate and becomes chemically attached to reactive sites produced by the ionizing radiation. By "chemically attached" is meant attachment by chemical, rather than merely physical (by absorption), bonds, such that the unsaturated acid cannot be removed by extraction with solvents for the acid used in the acid-modification. Due to the attachment of the unsaturated acid, the polyamides become highly receptive to basic dyes. Cross sections of acid-treated, irradiated nylon filaments dyed with basic dyes show deep dyeing throughout the fiber, proving that the acid has penetrated into the fiber. As further evidence of chemical attachment (grafting), polyamides with acrylic acid grafted thereto can be dissolved in 90% formic acid, then reprecipitated by the addition of water. When the precipitated polymer is recovered and titrated, it is found to have the same —COOH concentration as the original acid-modified nylon. If the acrylic acid had been merely held by mechanical bonds (e.g., as a paint film), it would not have been recovered with the polyamide precipitate.

In the second step of the treatment, i.e., formation of a salt of the acid, the cations apparently attach themselves to the acid groups which have been previously grafted onto the polymeric article, thereby forming an ionic network which imparts the unusual and unexpected properties to the polymer, as described herein. Many of these properties are those which are typical of a cross-linked polyamide. For example, the treated polyamide of this invention is substantially insoluble in hot m-cresol, a solvent for unmodified polyamide. Unlike conventionally cross-linked polyamides, however, the polyamides of this invention remain substantially soluble in 90% formic acid. By conventionally cross-linked polyamide, of course, is meant polyamide exposed to long periods of heating (in the melt), to high temperature oxidation, or polyamide polymerized in the presence of polyfunctional acids or amines, or polyamide exposed to extremely high doses of irradiation, beyond the range contemplated for the practice of this invention.

The ionizing radiation dose to which the polymer substrate is exposed while in contact with the unsaturated acid must be sufficient so that bonding is induced between the said acid and the substrate. In general a dose of about 0.01 mrep. (equivalent to an exposure of about 0.1 watt-sec./cm.$^2$) is adequate to initiate the bonding between the unsaturated acid and the polymer substrate. It is preferred to expose to a dosage of at least about 0.1 mrep. (equivalent to an exposure of about 1.2 watt-sec./cm.$^2$). Higher dosages may be used and are frequently highly beneficial, especially for radiation-resistant polymers such as polyethylene terephthalate and polyacrylonitrile. Dosages so high that substantial degradation of the shaped substrate occurs must obviously be avoided. It is usually satisfactory to irradiate polyamide, polyethylene terephthalate and polyacrylonitrile substrates with doses of 80 mrep. (1000 watt-sec./cm.$^2$) but doses substantially in excess of 160 mrep. (2000 watt-sec./cm.$^2$) are usually undesirable and unnecessary. In contrast, doses for cellulosic and vinyl halide polymers should usually not exceed 20 mrep.

The radiation dose sufficient to graft enough organic acid so as to provide at least 200 titratable acid groups/$10^6$ grams of polyamide will vary with the unsaturated acid used. For example, to obtain the same level of titratable acid groups, acrylic acid (since it is a homopolymerizable vinyl monomer, and is thus capable of undergoing a chain reaction), requires a smaller dose than maleic acid, which is not homopolymerizable. This effect is shown in Examples V and VI. Higher concentrations of acid assist in producing more pronounced modifications and hence lower radiation doses may be used with more concentrated acid solutions, as shown in Example VI.

The rate at which the sample is irradiated has been found to have an effect on the amount and type of grafting produced. For example, it has been found that when polyamide fabric soaked in acrylic acid is irradiated in four passes of 0.25 mrep. for each pass, the total amount of acid attached is greater than when a single pass of one mrep. is used. Thus, when a maximum amount of grafting for a given radiation dose is desired, a slower rate of radiation is preferred. However, the use of small doses in multiple passes results in attaching the acrylic acid as longer chains. For some purposes, it is preferred that the acid be attached as short chain segments, and for these purposes the single irradiation dose at higher rate is preferred.

The ionizing radiation step has been described in terms of irradiating the polymer substrate while in contact with the unsaturated acid. However, it is at times desirable to carry out the irradiation step on the polymer substrate alone and subsequently contact it with the unsaturated acid. This two-step process is particularly effective when the substrate is held at low temperatures during the irradiation and until contacted with the unsaturated acid or when the irradiation is carried out in a vacuum or in an inert gas atmosphere which is maintained until the polymer is contacted with the unsaturated acid. This two-step treatment is most effective in those cases in which the unsaturated acid is capable of undergoing additional homopolymerization.

Usually it will be satisfactory to carry out the irradiation of the shaped polymeric structure in contact with the unsaturated acid at room temperatures. However, higher temperatures are sometimes desirable, and may greatly increase the amount of organic acid attached to the polymeric article. Thus, temperatures in the range of 100–160° C. promote efficiency of grafting at a given radiation dose. Since high temperatures increase the tendency of the irradiated polymer to oxidize or degrade, it is advisable that oxygen be excluded from the region of the sample during their use. The two-step process, described hereinabove, permits the use of low irradiation temperatures, preserving the free radicals. The irradiated shaped polymeric structure is thereafter contacted with the unsaturated acid at elevated temperatures, thus promoting the efficiency and rate of the grafting reaction.

The method of applying the unsaturated organic acid to the shaped polymeric substrate is not critical. For example, it may be melt coated upon the polyamide, or padded on as a dispersion, a solution, a pure liquid or as an emulsion. For liquids, spraying is useful, or the polymeric article may be dipped therein. Alternatively the acid may be added as a vapor. If the unsaturated acid is stable at polymer melting temperatures, it may be added to the melt before shaping. Alternatively, it can be added to a polymer in solution, and shaping may then take place by wet or dry spinning. For example, a polyamide with the unsaturated acid grafted thereto may be incorporated in a formic acid solution and the polyamide spun into a bath containing dilute sodium hydroxide, thus forming the filament and carrying out the acid salt derivative formation (presumably a type of ionic cross-linking) in one operation.

The advantage of obtaining adequate penetration of the unsaturated acid into the polymer substrate has been emphasized. Some polymers are penetrable with difficulty by the acid, as previously described. Increased contact time and agitation is helpful in this regard, and it is also often beneficial to carry out the contacting at elevated temperatures, at super-atmospheric pressure or in the presence of swelling agents, dye carriers or the like.

In general, as previously pointed out, it is desirable to graft sufficient unsaturated acid to the polymeric article so that there will be at least 200 titratable acid groups per $10^6$ grams of the polymer, and preferably at least about 300 such groups. Usually the grafting of more acid will produce a greater change in the affected properties of the substrate. Amounts up to about 1,000 titratable acid groups are useful for polyamides which it is desired to be postformable, whereas even larger amounts of titratable acid groups are desirable for superior heat resistance.

After the acid groups are grafted to the shaped polymeric structure as disclosed hereinabove, any desired salt can be formed by simple treatment in aqueous solution, as already disclosed. Calcium ion is very readily picked up by the acid-modified polymer. If two or more cations are present in the treating solution one ion will usually be picked up in preference to the other. For example, when both sodium and calcium ions are present, the calcium salt will be formed in preference to the sodium. This is readily controlled by treating the acid-modified polymer with a solution in which calcium ion sequestrant (e.g., sodium hexametaphosphate) is included. Under those conditions of treatment, sodium ion is picked up in preference to the calcium ion. When lithium ion is substituted as the cation for sodium, then similar hydrophilic and heat resistant properties are obtained. It may at times be desirable to treat the acid-modified polymer simultaneously or consecutively with more than one species of ion to obtain multiple effects. For example, since calcium ion is very effective in improving heat resistance, after incorporating this ion throughout the body of a shaped structure, sodium ions may be attached at or near the surface (using calcium sequestrant and sodium ion) to improve the antistatic characteristics.

Shaped structures of the present invention, when in the form of fabric, have been described herein primarily in terms of increased resistance to hole-melting. However, in addition to these effects, such fabrics show increased resistance to flash heat, higher zero strength temperature (from 240° to 365° C. in the case of the polyamide of Example I). As illustrated, polyamides show a high degree of elasticity and deformability at high temperatures (e.g., above 185° C.). Because of this deformability the polyamide fabric treated in accord with the present invention may be given three-dimensional shape at high temperatures (e.g., by forming or embossing), which shape is retained on cooling. The shape is retained without fusing of the individual filaments and without deleterious effect on the fabric hand. When reheated above about 185° C. the fabric returns substantially to its original shape. Yarns of the salts of acid-modified polyamide may be elongated (drawn) at temperatures of 185° C. or above.

Upon heating a shaped structure (such as a fiber or fabric) produced from the salt of the acid-modified polymer of the present invention under relaxed conditions to temperatures of 185° C. or above, a shrinkage of 50% or more is observed. Such shrinkage is in addition to that which removes earlier post-deformations. Furthermore, it permits textured effects when yarns of modified and unmodified polymer are combined in the same fabric, or when the unsaturated acid or the metal ions are applied in a pattern (i.e., non-uniformly), or indeed when portions of the shaped substrate are shielded during the grafting of the unsaturated acid to the substrate.

It has also been found that the elastic modulus (at 25° C.) of fibers, yarns, etc. produced from the salt of the acid-modified polyamide of the present invention is substantially increased, especially when the structure is held under tension during the grafting operation.

In addition to the above, conventionally drawn polyamide yarn when treated as described herein becomes highly drawable at elevated temperatures (e.g., about 185° C.), as compared to the untreated yarn, as shown in Example XVIII below.

EXAMPLE XVIII 66 nylon yarn of 34 filaments is drawn to 5.17 times its as-spun length as taught by Babcock in United States Patent No. 2,289,232. The yarn has a denier of about 220. To prevent entanglement during washing, it is woven into a fabric having a polyethylene terephthalate warp. Samples of the fabric are soaked in a 25% aqueous solution of maleic acid. Three of these, BP, BQ and BR are irradiated using the technique and under the conditions of Example I. Sample BR is a control. A dose of 20 mrep. is used. Sample fabrics BP, BQ and BR are then thoroughly rinsed in distilled water to remove excess acid. Thereafter BP and BQ are agitated for several 30-minute periods in a 20-liter washing machine containing 18 liters of 70° C. distilled water and 20 grams of calcium acetate. The fabrics are again rinsed in distilled water to remove unreacted ions, dried, and the nylon yarn unraveled and then backwound onto cones. The treated irradiated yarn is then post drawn at a feed rate of 7 feet per minute over a hot pin at 160° C. and a hot surface at 250° C., using the apparatus of Hume (United States Patent No. 2,533,013). Yarn of fabric BP is drawn 2.1 times and BQ is drawn 2.6 times its original length. Control BR fuses and breaks immediately, when attempts are made to draw it. Two other controls, neither of which is soaked in maleic anhydride, but each of which is washed (BS being irradiated and BT being not irradiated), also breaks and fuse when attempts are made to draw them.

The advantages obtained by the practice of this invention have been largely described in terms of the effect on polymer properties at elevated temperatures. For this purpose the positively charged metallic ions are very effective. However, other very important changes in fabric properties can be attained by the practice of this invention. For example, fabrics to which unsaturated acid has been grafted, followed by formation of the sodium salt, thereby attain a new degree of crease recovery even under conditions of high relative humidity. Thus, fabrics treated according to the process of this invention after becoming wrinkled through use, can be brought back to their original wrinkle-free appearance by merely wetting and hanging up to dry. Ironing is not necessary.

It should be understood that the polymeric articles treated in accordance with the process of this invention, may contain the usual amounts of delustrants, antioxidants and the like, whereby improved appearance, light stability, heat durability and the like are obtained.

This application is a continuation-in-part of United States applications Ser. No. 595,210, filed July 2, 1956, Ser. Nos. 573,061 and 573,062, filed March 16, 1956, these in turn being continuations-in-part of United States applications Ser. No. 499,754, filed Apr. 6, 1955, and Ser. No. 503,790, filed April 25, 1955, each of said parent applications now being abandoned.

Many equivalent modifications will be apparent to those skilled in the art from a reading of the above without a departure from the inventive concept.

I claim:
1. A process which comprises intimately contacting a solid preformed polymeric structure substantially insoluble in water with a material from the class consisting of an aliphatically unsaturated organic non-phenolic-acidic compound and the salt of an aliphatically unsaturated organic non-phenolic-acidic compound, subjecting the composition to high energy ionizing radiation wherein a radiation dosage between about 0.01 mrep. and that at which substantial degradation of the reactants occurs is employed, thereby causing adherence among the composition components.
2. The process of claim 1 wherein the shaped structure is formed from a condensation polymer.
3. The process of claim 2 wherein the condensation polymer is a polyamide.
4. The process of claim 2 wherein the condensation polymer is polyhexamethylene adipamide.
5. The process of claim 2 wherein the condensation polymer is polycaproamide.
6. The process of claim 2 wherein the condensation polymer is a polyester.
7. The process of claim 6 wherein the polyester is polyethyleneterephthalate.
8. The process of claim 1 wherein the shaped structure is formed from an addition polymer.
9. The process of claim 8 wherein the addition polymer is an acrylonitrile polymer.

10. The process of claim 8 wherein the addition polymer is polyethylene.

11. The process of claim 1 wherein the unsaturated organic acid is methacrylic acid.

12. The process of claim 1 wherein the unsaturated organic acid is acrylic acid.

13. The process of claim 1 wherein the unsaturated organic acid is itaconic acid.

14. The process of claim 1 wherein the unsaturated organic acid is maleic acid.

15. The process of claim 1 wherein the unsaturated organic acid is styrene sulfonic acid.

16. A process which comprises intimately contacting a solid preformed polymeric structure substantially insoluble in water with a material from the class consisting of an aliphatically unsaturated organic non-phenolic-acidic compound and the salt of an aliphatically unsaturated organic non-phenolic-acidic compound, subjecting the composition to high energy ionizing radiation of sufficient dosage and intensity to induce bonding between the said shaped structure and the material contacted therewith, the said dosage being at least about 0.01 mrep. and less than that at which degradation of the said shaped structure and the said materials occurs to a substantial degree, thereby causing adherence among the composition components and, where an aliphatically unsaturated organic non-phenolic-acidic compound is a component of the irradiated composition, forming the salt of the said acid.

References Cited in the file of this patent

UNITED STATES PATENTS

| | | |
|---|---|---|
| 2,666,025 | Nozaki | Jan. 12, 1954 |
| 2,843,562 | Caldwell | July 15, 1958 |
| 2,861,051 | Caldwell | Nov. 18, 1958 |

FOREIGN PATENTS

| | | |
|---|---|---|
| 1,079,401 | France | May 19, 1954 |
| 499,577 | Canada | Jan. 26, 1954 |
| 66,034 | France | Dec. 12, 1955 |

(4th add. of No. 1,079,400).

OTHER REFERENCES

Chemical Industries, December 1949, pp. 885 and 986.

UNITED STATES PATENT OFFICE
CERTIFICATE OF CORRECTION

Patent No. 2,999,056　　　　　　　　　　　　　　September 5, 1961

David Tanner

It is hereby certified that error appears in the above numbered patent requiring correction and that the said Letters Patent should read as corrected below.

Column 7, line 52, for "farbic" read -- fabric --; line 68, for "100" read -- 1000 --; column 8, Table 3, column 3, line 1 thereof, for "$H_2PO-$" read -- $H_2PO_4^-$ --; same Table 3, column 3, line 2 thereof, for "$HPO_4^-$" read -- $HPO_4^=$ --; column 10, Table 8, in the heading of column 3 thereof, for "Figer" read -- Fiber --; column 11, line 16, for "asbscissa" read -- abscissa --; line 20, for "againt he" read -- again the --; column 13, line 52, for "sample" read -- samples --; column 14, line 49, after "as" insert -- a --; column 18, line 20, for "additional" read -- addition --; column 20, line 17, for "breaks" read -- break --; column 22, line 19, for "1,079,400" read -- 1,079,401 --.

Signed and sealed this 20th day of February 1962

(SEAL)
Attest:
ERNEST W. SWIDER　　　　　　　　　　　　　　DAVID L. LADD
Attesting Officer　　　　　　　　　　　　　　Commissioner of Patents